(12) United States Patent
Reiner et al.

(10) Patent No.: US 7,990,987 B2
(45) Date of Patent: Aug. 2, 2011

(54) NETWORK PROCESSOR HAVING BYPASS CAPABILITY

(75) Inventors: Thomas C Reiner, Agoura Hills, CA (US); Kirk Jong, Agoura Hills, CA (US); Phil Terry, Simi Valley, CA (US); Neely Walls, Agoura Hills, CA (US); Chris Haywood, Agoura Hills, CA (US); Michael de la Garrigue, Agoura Hills, CA (US); Adam Rappoport, San Diego, CA (US)

(73) Assignee: Topside Research, LLC, Williamsburg, VA (US)

( * ) Notice: Subject to any disclaimer, the term of this patent is extended or adjusted under 35 U.S.C. 154(b) by 1236 days.

(21) Appl. No.: 10/374,214

(22) Filed: Feb. 25, 2003

(65) Prior Publication Data

US 2004/0165590 A1 Aug. 26, 2004

(51) Int. Cl.
*H04L 12/56* (2006.01)
(52) U.S. Cl. .......................... 370/412; 370/392; 370/419
(58) Field of Classification Search .................. 370/392, 370/412, 419
See application file for complete search history.

(56) References Cited

U.S. PATENT DOCUMENTS

| | | | |
|---|---|---|---|
| 4,330,824 A | 5/1982 | Girard | |
| 4,394,725 A | 7/1983 | Bienvenu | |
| 5,555,543 A | 9/1996 | Grohoski | |
| 5,610,914 A | 3/1997 | Yamada | |
| 5,649,149 A | 7/1997 | Stormon | |
| 5,659,713 A | 8/1997 | Goodwin | |
| 5,784,003 A | 7/1998 | Dahlgren | |
| 5,841,874 A | 11/1998 | Kempke | |
| 5,845,145 A | 12/1998 | James | |
| 5,860,085 A | 1/1999 | Stormon | |
| 5,898,689 A | 4/1999 | Kumar | |
| 5,923,893 A | 7/1999 | Moyer | |
| 5,956,342 A * | 9/1999 | Manning et al. | 370/414 |
| 5,961,626 A | 10/1999 | Harrison | |
| 5,982,749 A | 11/1999 | Daniel | |
| 5,982,776 A * | 11/1999 | Manning et al. | 370/414 |
| 6,026,092 A | 2/2000 | Abu-Amara | |
| 6,067,408 A | 5/2000 | Runaldue | |

(Continued)

OTHER PUBLICATIONS

Petaswitch Solutions, Inc., The Pisces Chipset, Product Brief, 2001, http://www.peta-switch.com/products/product_brief.htm.

(Continued)

*Primary Examiner* — Jason E Mattis
(74) *Attorney, Agent, or Firm* — SoCal IP Law Group LLP; Steven C. Sereboff; M. Kala Sarvaiya

(57) ABSTRACT

A network processor having bypass capability in which some data units are diverted from being processed by the processor core of the network processor. In one embodiment, a network processor may include a receiver to receive data units, configuration information used to evaluate whether the data units require processing, a processor core to process data units that require processing, a bypass store to hold those data units which do not require processing by the processor core, and a transmitter to transmit the data units. In one embodiment, a method may include receiving a plurality of data units, receiving configuration information, evaluating whether each of the data units requires processing based on the configuration information, bypassing processing those of the data units that do not require processing based on the evaluating, processing those of the data units that require processing based on the evaluating, and transmitting the data units.

24 Claims, 9 Drawing Sheets

U.S. PATENT DOCUMENTS

| | | | |
|---|---|---|---|
| 6,122,674 | A | 9/2000 | Olnowich |
| 6,138,185 | A | 10/2000 | Nelson |
| 6,188,689 | B1 | 2/2001 | Katsube |
| 6,292,878 | B1 | 9/2001 | Morioka |
| 6,346,946 | B1 | 2/2002 | Jeddeloh |
| 6,389,489 | B1 | 5/2002 | Stone |
| 6,442,674 | B1 | 8/2002 | Lee |
| 6,477,623 | B2 | 11/2002 | Jeddeloh |
| 6,493,347 | B2 | 12/2002 | Sindhu |
| 6,510,138 | B1 | 1/2003 | Pennell |
| 6,570,876 | B1 | 5/2003 | Aimoto |
| 6,574,194 | B1 | 6/2003 | Sun |
| 6,611,527 | B1 | 8/2003 | Moriwaki |
| 6,658,503 | B1 | 12/2003 | Agarwala |
| 6,687,768 | B2 | 2/2004 | Horikomi |
| 6,714,555 | B1 | 3/2004 | Excell |
| 6,735,219 | B1 | 5/2004 | Clauberg |
| 6,795,870 | B1 | 9/2004 | Bass |
| 7,072,295 | B1 | 7/2006 | Benson |
| 7,170,900 | B2 * | 1/2007 | Berggreen .................. 370/412 |
| 2001/0037435 | A1 | 11/2001 | Van Doren |
| 2002/0054602 | A1 | 5/2002 | Takahashi |
| 2002/0061022 | A1 | 5/2002 | Allen et al. |
| 2002/0099855 | A1 | 7/2002 | Bass et al. |
| 2002/0118692 | A1 * | 8/2002 | Oberman et al. ............ 370/419 |
| 2002/0122386 | A1 | 9/2002 | Calvignac et al. |
| 2002/0165947 | A1 | 11/2002 | Akerman et al. |
| 2003/0035427 | A1 | 2/2003 | Alasti |
| 2003/0067929 | A1 * | 4/2003 | Matsuzawa .................. 370/401 |
| 2004/0230735 | A1 | 11/2004 | Moll |

OTHER PUBLICATIONS

Petaswitch Solutions, Inc., PetaSwitch Solutions Announces Raising $4 Million in First Round Financing, Press Release, 2001, http://peta-switch.com/newsroom/press_releases.htm.

Petaswitch Solutions, Inc., Company Overview, 2001, http://www.pete-switch.com/markets/overview.htm.

* cited by examiner

NETWORK PROCESSOR HAVING BYPASS CAPABILITY

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office

BACKGROUND OF THE INVENTION

1. Field of the Invention

The invention relates to network processors residing in a network device that are used to process network communications. More specifically, this invention relates to improving the performance of network processors that process network communications that may involve voice, data, images, video and other information.

2. Description of Related Art

It is highly desirable for network switches and network processors included in the network switch to support full duplex traffic, that is network traffic that runs in both ingress and egress directions simultaneously. However, supporting duplex network traffic places a large burden on network processors. This is problematic because all traffic in both directions typically, passes through all the processing functions of the network processor. In most cases, one direction of traffic has considerably less processing requirements than the other, such that requiring all traffic to flow through all the network processor's resources may be quite wasteful. Bottlenecks may occur when there are insufficient resources to service the overall traffic demands caused by the duplex communications.

Traditional implementations of network processors require a processor core to process all incoming (ingress) and outgoing (egress) data units. This causes backups or blockages in the processor core of the network processor which may be referred to as backpressure. Further, in traditional implementations network processors drop frames, pass unmodified frames, and partially process frames sent through network processor at least in some part because the processor core processes each and every frame that is provided to the network processor. Backpressure is undesirable in networking applications because it will result in delayed communications and a resulting reduction in the quality of service provided. Dropping frames causes service interruptions, and places a larger load on the network as the dropped frame has to be detected, re-requested, and re-transmitted. Passing an unmodified frame through the network processor requires network processor resources and, as such, will increase the probability of blockage and backpressure. In addition, partially modified frames have little to no utility in the network.

DETAILED DESCRIPTION OF THE INVENTION

Figure 1A:
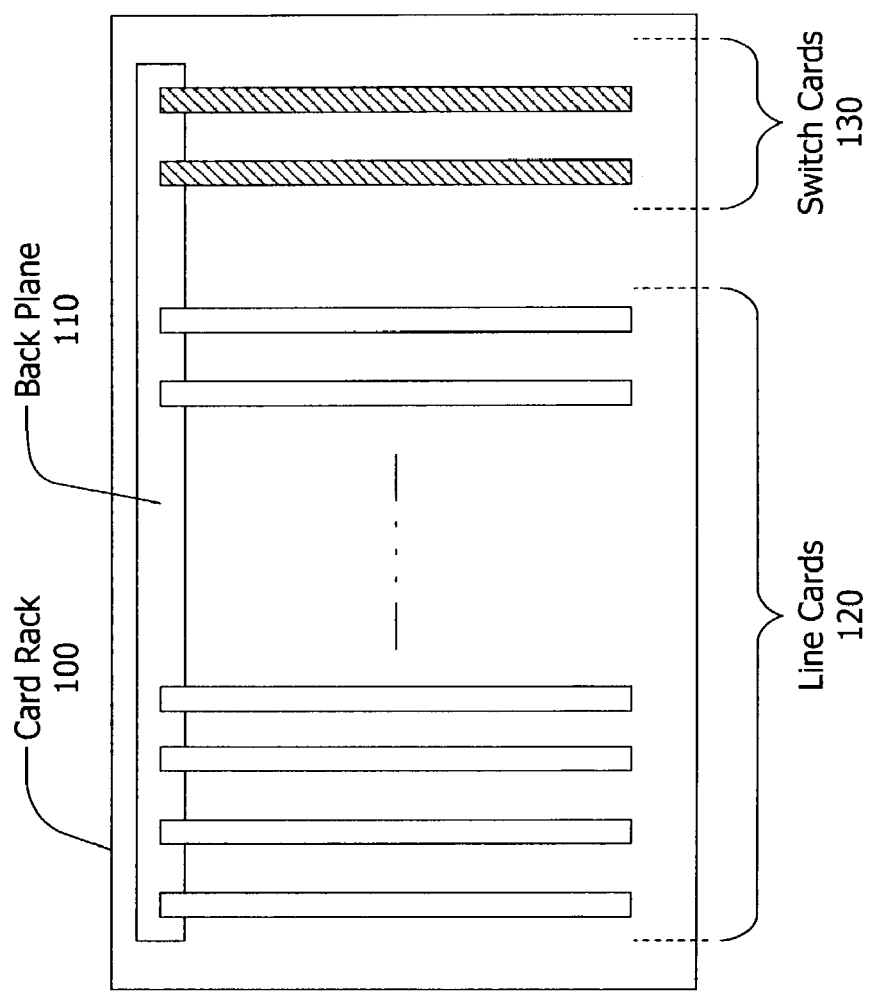
FIG. 1A illustrates a top view of a network device card rack.

Communications systems are typically arranged in card racks. FIG. 1A illustrates a top view of a network device card rack 100. In one embodiment, the network device may be a switch. In other embodiments, the network device may be a router, relay, hub, multiplexor, or other networking device that acts on network communications. Network communications may exist in various forms, including frames, cells, datagrams, packets or other units of information, all of which are referred to herein as data units. Typically, two or more line cards 120 and one or more switch cards 130 are coupled to a back plane 110 of the card rack 100. Switch cards may in some configurations be referred to as a switch fabric. In one embodiment, back plane 110 provides power to line cards 120 and switch cards 130. In addition, back plane 110 serves as a bus or communications medium for line cards 120 and switch cards 130. Bus 110 may perform serialization/deserialization (SERDES) functions and may operate at a high speed, such as 3.125 Gbps. In one embodiment, card rack 100 may support one or more well known standards or protocols such as the 10 Gigabit Ethernet and 10 Gigabit fibrechannel standards, and may support proprietary protocols as well. Data units from switch cards, other card racks, local networks and remote networks are received by the line cards 120 and various processing is performed by the line cards on incoming and/or outgoing data units.

Figure 1B:
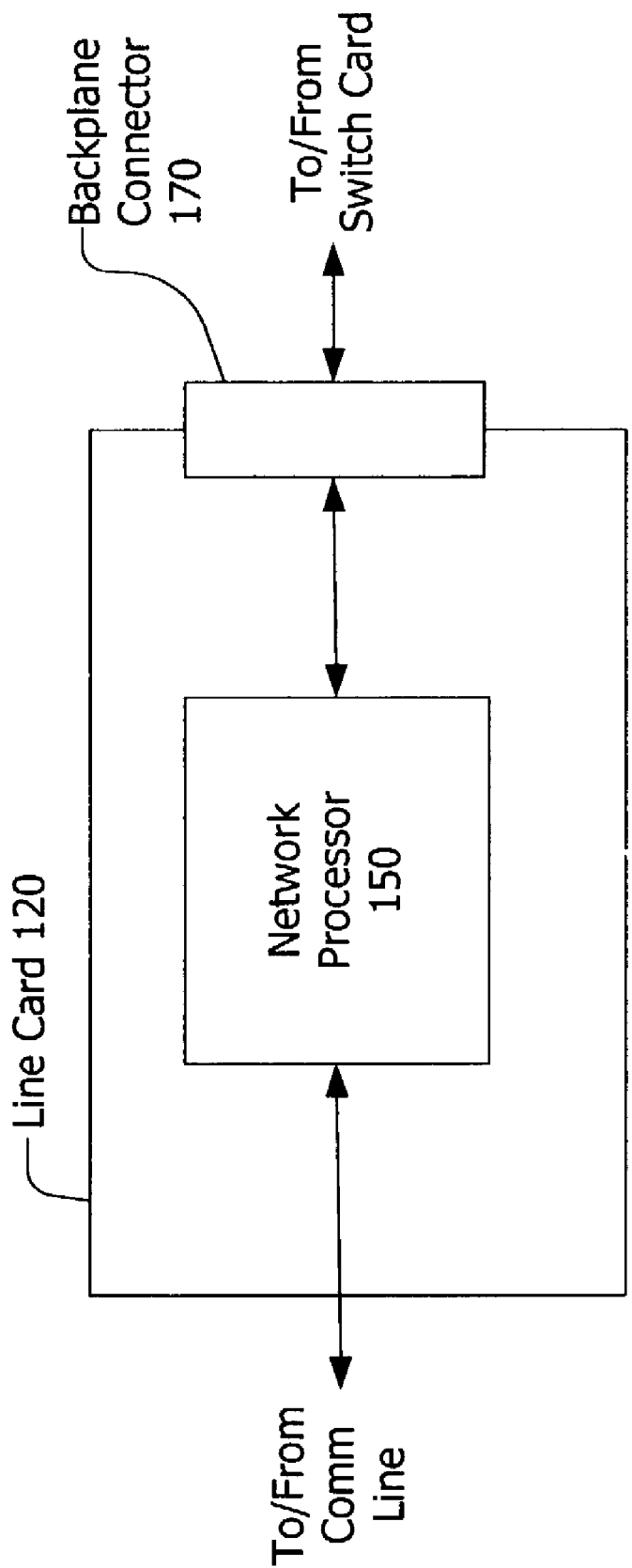
FIG. 1B illustrates an embodiment of a communications network line card.

FIG. 1B illustrates an architecture of an embodiment of communications network line card 120. In one embodiment, line card 120 may be a duplex line card that receives data units from a communications line, processes the data units and transfers them to a switch card while concurrently receiving data units from a switch card for processing and transmission on the communications line. For incoming communication, data units may be received from a communications line, not shown, and processed by network processor 150. Network processor 150 may receive and send data according to any well known standards, including 10 Gbps Optical Internetworking Forum (OIF) system packet interface, level 4 (SPI-4), and may also conform to one of the optical carrier (OC) level standards such as OC-192c (10 Gbps) and OC-768c (40 Gbps), as well as other well known standards. Network processor 150 receives data units from and sends data units to a switch card via backplane connector 170 for further processing and/or transmission. Network processor 150 may also receive data units from and send data units to a destination on the communications line.

In one embodiment, network processor 150 may be augmented by an external framer unit which may be included in the line card 120. In one embodiment, the network processor 150 may evaluate which data units should be sent at what time, including balancing and evaluating various priorities, or these tasks may be included in an adjacent external traffic manager that may be included in the line card 120. Data units may be stored by network processor 150 in local or internal on-chip memory, and/or in external memory which may be coupled to the line card 120 adjacent to the network processor.

Described herein is a network processor like network processor 150. The network processor described herein provides a method for discriminating between classes of data units to allow for bypassing certain data units from processing typically performed by the processor core of the network processor. The bypassing operation reduces the demands on and concomitant load on the processor, thus enabling the processing of more data units and/or more processing per data unit. A resulting benefit of the network processor described herein is that higher throughput of data units can be achieved by allocating the gained additional processor cycles for execution on data units that need processor controlled modification. The resultant packet latency through a switch or other network device that includes a network processor utilizing the techniques described herein is reduced when compared to switches or other network device that include traditional network processors. The bypassing technique also provides a facility for packet modification without processor core interaction so that other network processor services afforded to "normally processed" data units are available to data units that bypass the processor core.

In other embodiments, the methods described herein regarding a network processor may be implemented on an application specific integrated circuit (ASIC), a programmable logic array (PLA), and other kinds of programmable silicon devices.

Figure 2:
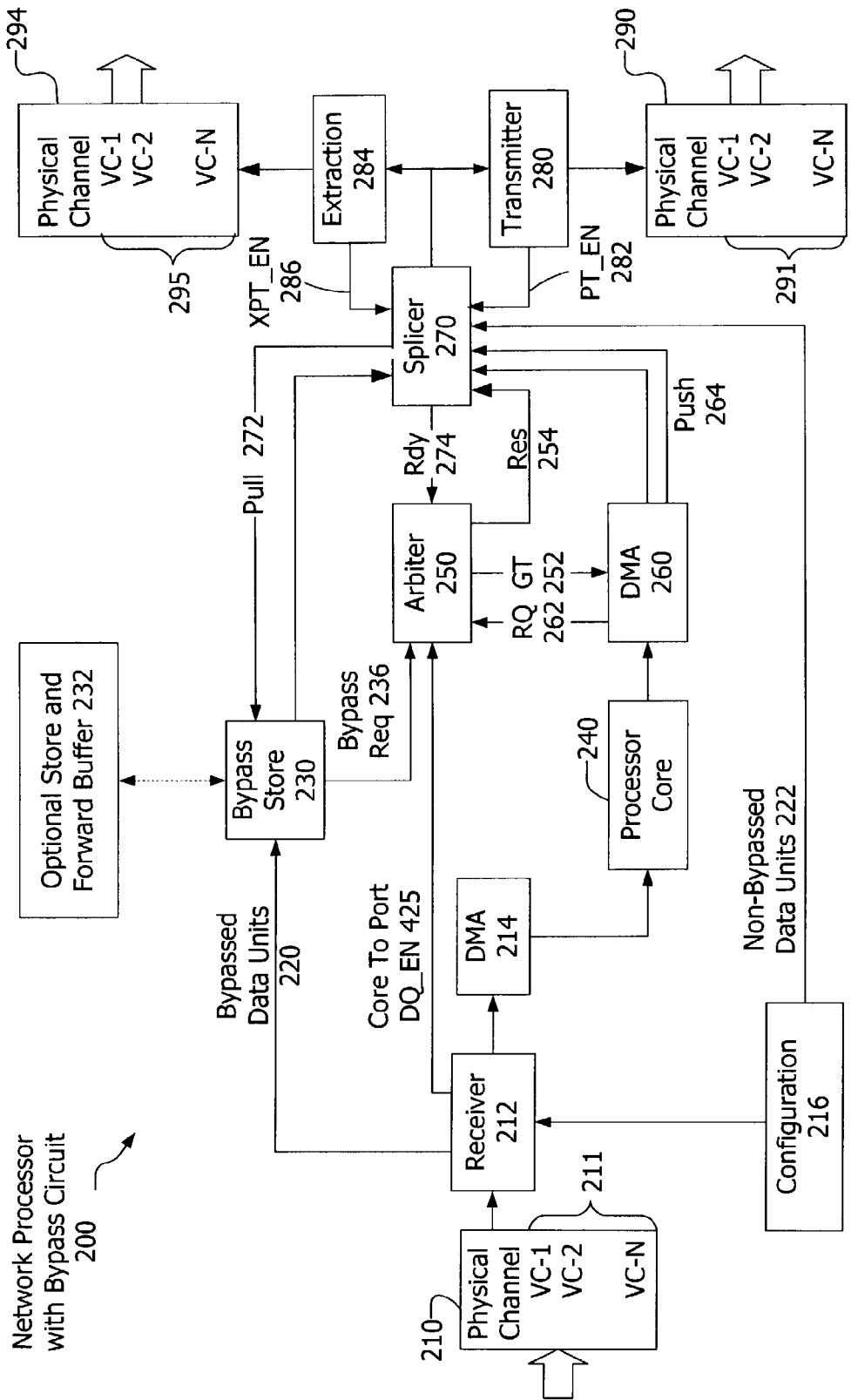
FIG. 2 illustrates an architecture of an embodiment of a network processor having a simplex bypass circuit.

Although the network processor described herein will most often be used in a duplex communications environment, it is instructive to review how the techniques may be implemented in a network processor that is used in a simplex configuration. FIG. 2 illustrates an architecture of an embodiment of a network processor having a simplex bypass circuit 200.

Information that travels on a network is typically allocated into data units. The data units may be communicated on channels. Multiple virtual channels may be multiplexed and transported by a single physical channel as is well known to those skilled in the art. The individual channels may be maintained using virtual ports as the ports allow for discrimination of the data units into separate streams. Virtual ports may contain port identifiers which allow the receiver to demultiplex the stream. The port identifier is a handle that may be used to discern whether a data unit requires routing to a processor core for modification or whether it can be routed around the processor core to a bypass store.

In this embodiment, the data units traverse the network processor from a single receiver 212 and exit from a single transmitter 280. The network processor may be configured by an external host, which may direct the network processor to perform full processing on data units from certain ports and to bypass data units from specified ports by directing them to a bypass store 230 rather than to the processor core. An example external host is a computer running a network manager software program.

In this embodiment, data units are received over physical channel 210. Physical channel 210 may be any well known communication line running any of a number of well known protocols, including any version of Ethernet and the data units may be internet protocol (IP) packets. The network processor may be protocol independent and, in one embodiment, may process data from a physical communication channel as fast as 10 Gbps. Communication channels may conform to one or more of the following well known standards: 10Base-T and 100Base-T Fast Ethernet, Gigabit Ethernet, synchronous optical network (SONET), asynchronous transfer mode (ATM), integrated services digital network (ISDN), digital subscriber line (DSL), cable modem, Internet small computer system interface (iSCSI), Internet Protocol (IP), multiprotocol label switching (MPLS), and the like.

Data units are received by receiver 212 and, based on configuration information received from an external host and stored in a dedicated configuration storage 216, the class or type of data unit is examined and routed accordingly. The class or type of data unit may be determined by a check of the port identifier of the virtual channel 211 to learn whether it corresponds to a port identifier of a virtual channel 211 which contains bypassed data units 220 or a port identifier of a virtual channel 211 which contains non-bypassed data units 222. The receiver 212 sends data units destined for the processor core 240 into the DMA module 214, while data units destined to take the bypass path are sent directly from the receiver 212 to the bypass storage buffer 230. Receiver 212 supports the processing of non-bypassed data units 222 by sending the virtual port number and core ID to the arbiter 250. This mechanism allows the arbiter 50 to properly keep the order of data units correct on each virtual port.

In one embodiment, non-bypassed data units 222 are sent through direct memory access (DMA) device 214 to be processed by the processor core 240. Receiver 212 sends information, in one embodiment, Core To Port DQEN 225, to the arbiter 250, informing the arbiter 250 that a non-bypassed data unit 222 will be sent to the processor core 240 for processing. The Core To Port DQ_EN 225 information is subsequently used by the arbiter 250 to extract non-bypassed data units 222 from the processor core 240. Bypassed data units 220 are diverted from the processor core 240 such that no processing will be performed on the data unit. This is achieved by the receiver 212 sending bypassed data units 220 directly to the bypass store 230.

In some situations, a stream of data units may be assigned a particular virtual channel or port. Those ingress channels which may be bypassed include, for example, data units that make up a direct, persistent communication stream. An example stream that is a candidate for bypass is SONET traffic that travels through a digital cross connect switch. In this example, connections between ports are statically set up and persist until the configuration of the switch is changed. Generally, many ingress channels have streams of traffic, such as IP, ATM, ethernet, Packet Over Sonet (POS), that require some kind of processing and are, therefore, not suitable for bypass.

The non-bypassed data units 222 are received by a processor core 240 which processes the data units. The processing that may be performed includes parsing, classification, table hookups, header modification, header editing, statistics collection, statistics policing, fragmentation, etc. The processor core 240 may be a single core processor or may be an array of multiple core processors that may have 32, 64, 128, 256, 512, etc. core processors. As sued herein, the terms processor core refers to both single core processors and an array or core processors.

After being processed by the processor core 240, the non-bypassed data units await an available port for transmission. In one embodiment, the non-bypassed data units 222 are sent via DMA 260 to splicer 270 after requesting an available communications channel from arbiter 250 and receiving a grant GT signal 252 back from the arbiter 250 in response. A GT signal 252 from the arbiter indicates that the splicer 270 is ready to accept a non-bypassed data unit 222 from the DMA 260 for that particular port. The GT signal 252 is generated by the arbiter 250 based on port availability once the non-bypassed data units 222 have been processed by the processor core 240. Arbiter 250 receives a request from DMA 260 and sends a port reservation request 254 to splicer 270. Arbiter 250 determines the correct port reservation request by polling the Core To Port DQ_EN 225 information sent by the receiver 212 with each non-bypassed data unit 222 received. Splicer 270 sends a ready signal 274 when a channel is available for the current non-bypassed data unit. The arbiter sends a grant GT signal 252 to DMA 260 upon receipt of the ready signal 274 from splicer 270. To initiate transfer of non-bypassed data units 222, DMA 260 sends a push signal 264 to splicer 270 in an attempt to push the processed data unit onto an available communication channel.

Upon receipt of a processed data unit, splicer 270 forwards the data unit to transmitter 280 for communication over one of the virtual channels 291 that comprise physical channel 290, or to extraction unit 284 which transmits the data unit to an external host via a virtual channel 295 of physical channel 294. This transmission is completed while either of the port enable signals, the PT_EN signal 282 or the XPT_EN signal 286, indicates that the specified virtual channel is enabled to receive data.

The network processor with a simplex bypass circuit 200 reduces the load on processor core 240 by diverting data units from channels that do not require processing away from processor core 240. Bypassed data units 220 from bypassed channels are buffered in bypass store unit 230 as they await delivery to splicer 270.

In one embodiment, bypass store 230 may be implemented with a store and forward technique. The store and forward technique requires a store and forward memory buffer 232 coupled to, or included in, bypass store 230 of sufficient size to hold an entire data unit before the data unit is passed to splicer 270 and then to transmitter 280. The store and forward technique has the benefit of bypass store 230 completely receiving a data unit before retransmission. In this way, the store and forward technique allows for more robust error detection than the passthrough technique, and allows for the checking of boundaries within a data unit. However, the store and forward technique requires larger memories and more system resources, particularly when there is a large data unit followed by a group of minimum sized data units.

In another embodiment, a passthrough technique may be used. In the passthrough technique, the head of a data unit is fed from the bypass store 230 through splicer 270 and to transmitter 280 while the body of the same data unit is entering receiver 212. The passthrough technique requires a bypass store 230 of a size sufficient to store that part of a data unit long enough to account for the delivery latency of other channels to transmitter 280. Further, the bypass store 230 required of the passthrough technique is much smaller than the store and forward buffer 232 that is needed for the store and forward technique. The passthrough technique may be used to save costs and die space as smaller buffer memories are required for the bypass store.

Arbiter 250 controls transmission of data units via physical channels 290 and 294. With regard to bypassed data units, arbiter 250 receives bypass request 236 from bypass store 230, signaling that a bypassed data unit or portion of a bypassed data unit is present and requires transmission. With regard to non-bypassed data units, arbiter 250 receives request 262 from DMA unit 260, signaling that data units that have completed modification by processor core 240. Arbiter 250 monitors the readiness of splicer unit 270 to pull bypassed data units from bypass store 230. When a bypassed data unit is available, arbiter 250 extends a port reservation 254 to splicer 270. When a port is ready, splicer 270 sends ready signal 274 to arbiter 250. Splicer 270 responds by pulling the bypassed data unit out of bypass store 230 and forwarding it to transmitter unit 280. This is achieved by splicer 270 sending pull signal 272 to bypass store 230.

In one embodiment, splicer 270 employs a fair use algorithm on available channels. In one embodiment, splicer 270 sends 128-byte portions of a data unit in a round robin fashion to transmitter 280 for each virtual channel 291 of physical channel 290. If bypass store 230 has fewer than 128-bytes, then splicer 270 will transfer whatever amount of data is available. Splicer 270 hunts for the end of the data unit to determine that the port reservation has been satisfied. While the port enable PT_EN signal 272 is asserted by the transmitter 280 for virtual channel 291, the splicer 270 marks the port as ready.

In addition, in one embodiment, splicer 270 may perform limited processing on bypassed data units. The limited processing may be controlled by information provided by an external host and located in configuration storage 216 which may be coupled to splicer 270. The kinds of limited splicer processing are discussed in more detail below with respect to FIG. 7.

Figure 3:
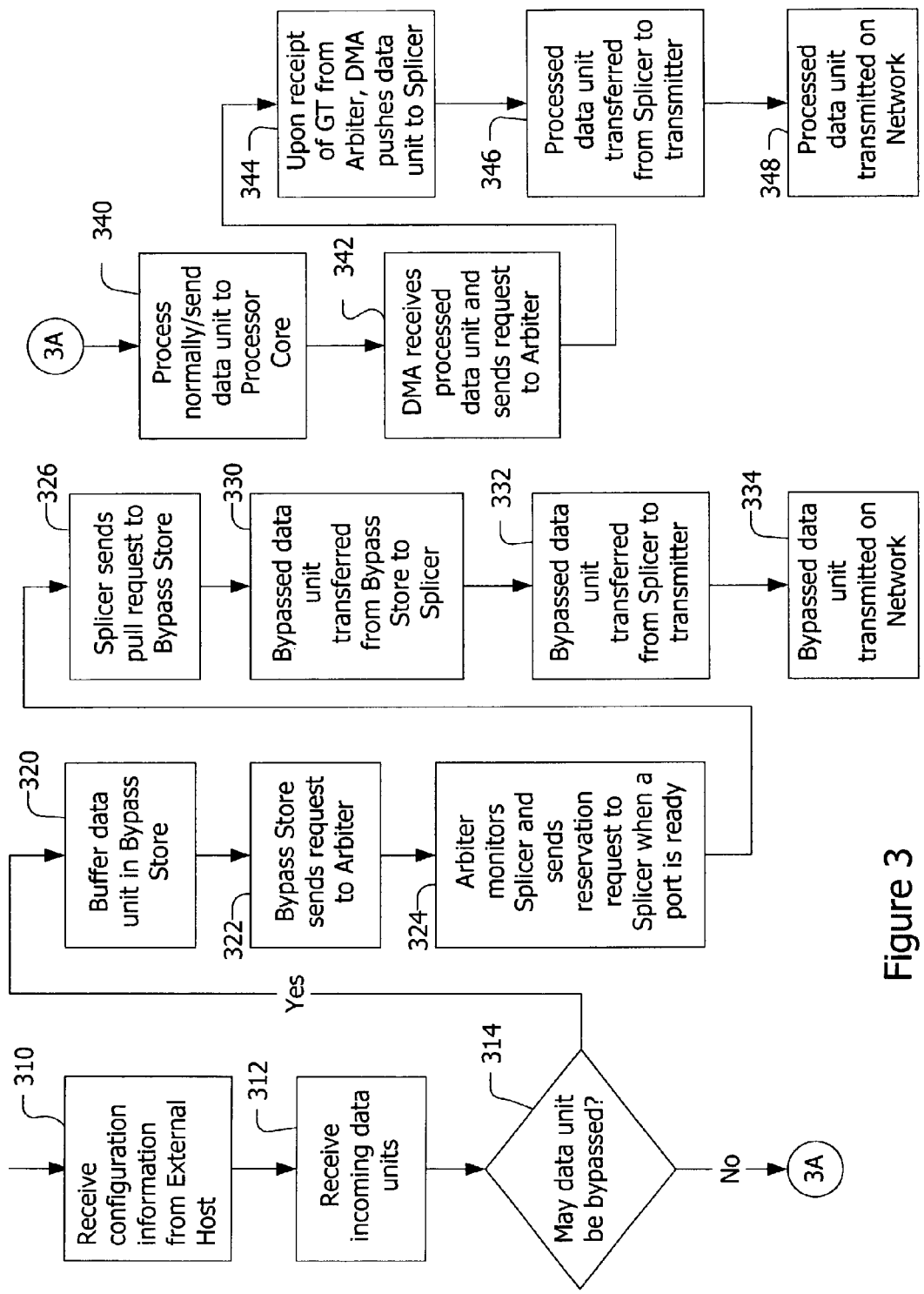
FIG. 3 illustrates the flow of actions taken according to an embodiment of a network processor having a simplex bypass circuit.

FIG. 3 illustrates the flow of actions taken according to an embodiment of a network processor having a simplex bypass circuit. The network processor receives configuration information from an external host, as shown in block 310. The configuration information may specify which channels or ports include data units which do not require processing and may bypass the processor core. This configuration information may specify a numerical or other identifier of those channels or ports having data units which may be bypassed. The network processor receives incoming data units, as shown in block 312, and determines whether the data unit may be bypassed, as shown in block 314. To check whether the data unit should be bypassed, the channel or port identifier of the data unit is compared with the configuration information to evaluate whether the data unit should be bypassed. If the data unit may be bypassed, that is, the port or channel identifier matches an identifier in the configuration information, the flow of actions continues with block 320.

If the data unit may be bypassed, the data unit is buffered in the bypass store, as shown in block 320. The bypass store sends a request to the arbiter for an available port over which to send the buffered bypassed data unit, as shown in block 322. The arbiter monitors the splicer and sends a reservation request to the splicer when a port is ready, as shown in block 324. The splicer sends a pull request to the bypass store when a port is available, as shown in block 326. In response to the pull request, the bypass store transfers the bypassed data unit to the splicer, as shown in block 330. If the specified channel corresponding to the port is enabled, the splicer transfers the bypassed data unit to the transmitter, as shown in block 332, and the bypassed data unit is transmitted on a network, as shown in block 334.

In addition, the splicer may perform limited processing on bypassed data units. The limited processing may be controlled by an external host. The kinds of limited splicer processing are discussed in more detail below with respect to FIG. 7.

If the data unit may not be bypassed, the data unit is processed normally such that the data unit is sent to the processor core within the network processor, as shown in block 340. After the data unit is processed, a port request is sent to the arbiter, in one embodiment, through a DMA unit, as shown in block 342. Upon receipt of a signal from the arbiter, the DMA unit pushes the processed data unit to the splicer, as shown in block 344. If the specified channel corresponding to the port is enabled, the splicer transfers the processed data unit to the transmitter, as shown in block 346. The processed data unit is transmitted on a network, as shown in block 348.

Figure 4:
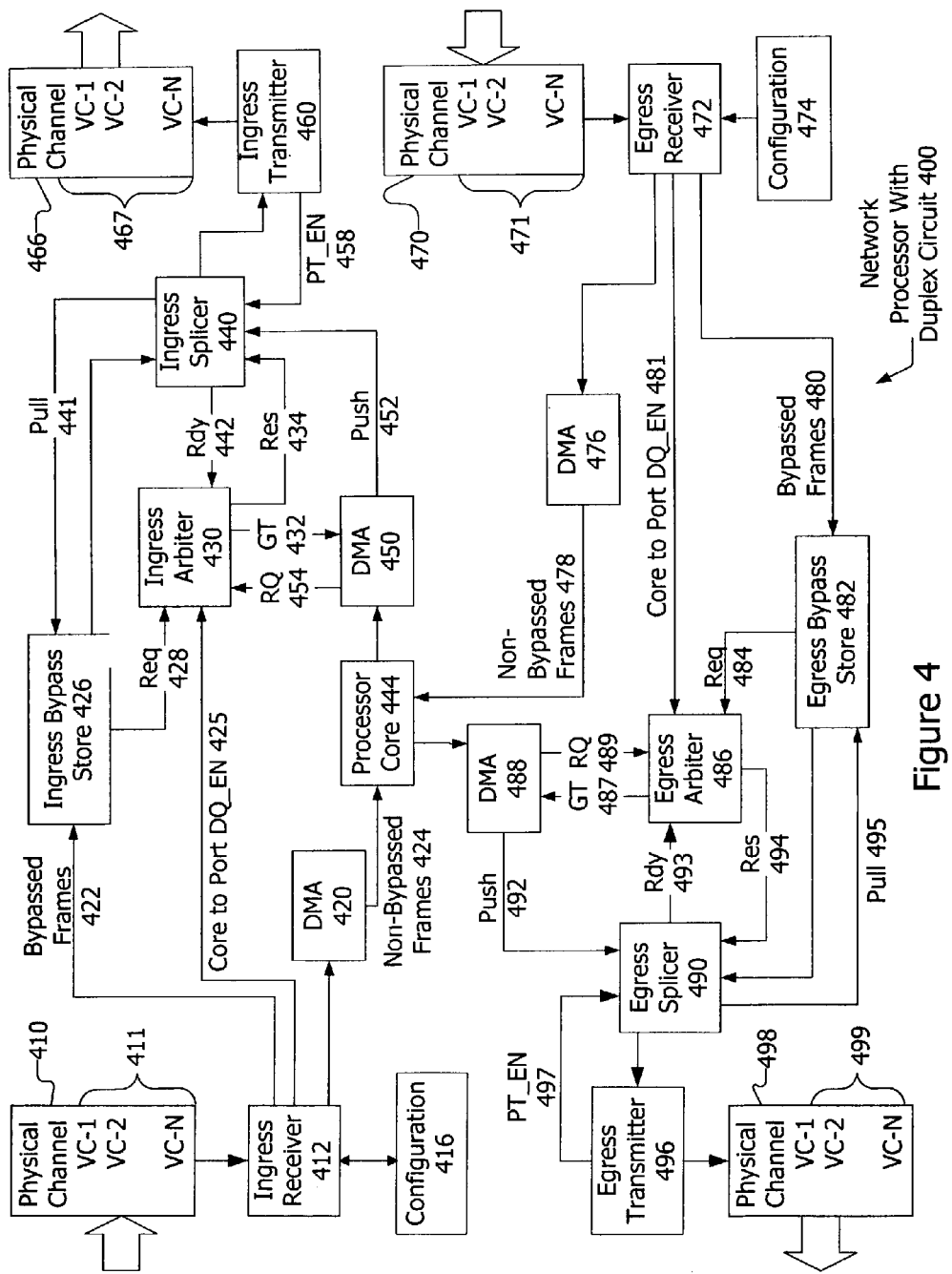
FIG. 4 illustrates an architecture of an embodiment of a network processor having a full-duplex bypass circuit.

The simplex embodiment of a network processor described above regarding FIGS. 2 and 3 may be extended to a full duplex case, as shown in FIG. 4 which illustrates an architecture of an embodiment of a network processor having a full-duplex bypass circuit 400. In the full duplex embodiment of the network processor, there are two sets of receivers/transmitters. Ingress receiver 412 and ingress transmitter 480 support incoming data units while egress receiver 472 and egress transmitter 496 support outgoing data units. Both the ingress and egress components share processor core 444, which creates an even heavier load on processor core 444 when compared to the simplex circuit discussed above regarding FIGS. 2 and 3. Therefore, the benefits of bypassing the processor core 444 are even greater in this case when compared to the simplex circuit discussed above regarding FIGS. 2 and 3. The network processor with a duplex bypass circuit 400 reduces the load on processor core 444 by diverting data units from ingress and egress channels that do not require header or other modification or processing away from processor core 444 to a bypass store.

In this embodiment, incoming data units are received over a virtual channel 411 of physical channel 410 by ingress receiver 412. Based on the configuration information stored in ingress configuration storage 416, the class or type of data unit may be determined by a check of the port identifier of the virtual channel 411 to learn whether it corresponds to a port identifier of a virtual channel 411 which contains bypassed data units 422 or whether it corresponds to a port identifier of a virtual channel 411 which contains non-bypassed data units 424. Non-bypassed data units 424 are sent through direct memory access DMA device 420 to be processed by processor core 444. Ingress receiver 412 also sends Information Ingress Core To Port DQ_EN 425 to the arbiter 430 that a non-bypassed data unit 424 will be sent to the processor core 444 for processing. The ingress Core To Port DQ_EN 425 information is subsequently used by the ingress arbiter 430 to extract the non-bypassed data unit 424 from the processor core 444. Bypassed data units 420, which will be diverted from the processor core 444 such that no processing will be performed on the data unit, are sent directly to the ingress bypass store 426.

The non-bypassed data units 424 are received by processor core 444 which processes the data units. After being processed, the non-bypassed data units 424 are sent via DMA 450 to ingress splicer 440. DMA 450 transfers data units to ingress splicer 440 after requesting an available communications channel from ingress arbiter 430 and receiving a GT signal 432 in response. A GT signal 432 from the ingress arbiter 430 indicates that the ingress splicer 440 is ready to accept a non-bypassed data unit 424 from the ingress DMA 450 for that particular port. The GT signal 432 is generated by the ingress arbiter 430 based on port availability once the non-bypassed data units 424 have been processed by the processor core 444. Ingress arbiter 430 receives a request 454 from DMA 450 and sends a reservation request 434 to ingress splicer 440. Ingress arbiter 430 determines the correct port reservation request 434 on by polling the ingress Core To Port DQ_EN 425 information that was sent by the ingress receiver 412 that accompanies each non-bypassed data unit 424. Ingress splicer 440 sends a ready 442 signal when a channel is available for the current data unit. Ingress arbiter 430 sends a GT 232 signal to DMA 450 upon receipt of the ready 442 signal from ingress splicer 440. To initiate the data unit transfer, in one embodiment, DMA 450 sends a push 452 signal to ingress splicer 440 in an attempt to push the data unit onto an available communication channel. Ingress splicer 440 forwards the data unit to ingress transmitter 460 for communication over one of the virtual channels 467 that comprise physical channel 466. While the port enable PT_EN signal 458 is asserted by the ingress transmitter 460 for a virtual channel 467, the splicer 440 marks the port corresponding to the virtual channel as ready. In one embodiment, ingress transmitter 460 transmits the data unit to a switch card.

Bypassed data units 422 from bypassed channels are buffered in ingress bypass store unit 426 as they await delivery to ingress splicer 440. In one embodiment, ingress bypass store 426 may be implemented using a store and forward technique. In another embodiment, a passthrough technique may be used. The store and forward and the passthrough techniques may be implemented as described above regarding FIG. 2.

Ingress arbiter 430 receives bypass requests 428 from ingress bypass store 426, signaling that a bypassed data unit or portion of a bypassed data unit is present and requires transmission. Ingress arbiter 430 also receives request 454 from DMA unit 450, signaling that a data unit has completed modification by processor core 444. Ingress arbiter 430 monitors the readiness of ingress splicer 440 to pull bypassed data units from ingress bypass store 426. Ingress arbiter 430 places a port reservation 434 with ingress splicer 440. When a port is ready, ingress splicer 440 sends ready signal 442 to ingress arbiter 430. Ingress splicer 440 responds by pulling the bypassed data unit out of ingress bypass store 426 and forwarding it to ingress transmitter 460. This is achieved by ingress splicer 440 sending pull signal 441 to ingress bypass store 426. In one embodiment, ingress splicer 440 employs a fair use algorithm on available channels. In one embodiment, ingress splicer 440 sends 128-bytes in a round robin fashion to ingress transmitter 460 for each virtual channel 467 of physical channel 466. If ingress bypass store 426 has fewer than 128-bytes, ingress splicer 440 will transfer whatever amount of data is available. Ingress splicer 440 hunts for the end of the data unit to determine that the port reservation has been satisfied and marks the port as ready when the end of the data unit has been reached.

In addition, ingress splicer 440 may perform limited processing on bypassed data units. The limited processing may be controlled by configuration information provided by an external host. The kinds of limited splicer processing are discussed in more detail below with respect to FIG. 7.

With regard to outgoing traffic, outgoing data units are received over a virtual channel 471 of physical channel 470 by egress receiver 472. Based on the configuration information stored in egress configuration storage 474, the class or type of data unit may be determined by a check of the port identifier of the virtual channel 471 to learn whether it corresponds to a port identifier of a virtual channel 471 which contains bypassed data units 480 or non-bypassed data units 478. Non-bypassed data units 478 are sent through egress DMA device 476 to be processed by processor core 444. Egress receiver 472 also sends information ingress Core To Port DQ_EN 481 to the egress arbiter 486 informing the egress arbiter 486 that a non-bypassed data unit 478 will be sent to the processor core 444 for processing. The egress Core To Port DQ_EN 481 information is subsequently used by the egress arbiter 486 to extract the non-bypassed data unit 478 from the processor core 444. Bypassed data units 480, which will be diverted from the processor core 444 such that no processing will be performed on the data unit, are sent directly to the egress bypass store 426.

The non-bypassed data units 478 are received by processor core 444 which processes the data units. After being processed, the non-bypassed data units 478 are sent via DMA 488 to egress splicer 490. DMA 488 transfers data units to egress splicer 490 after requesting an available communications channel from egress arbiter 486 by sending request signal (RQ) 489 and receiving a GT signal 487 in response. A GT signal 487 from the egress arbiter 486 indicates that the egress splicer 490 is ready to accept a non-bypassed data unit 478 from the egress DMA 488 for that particular port. The GT signal 487 is generated by the egress arbiter 486 based on port availability once the non-bypassed data units 478 have been processed by the processor core 444. Egress arbiter 486 receives request (RQ) 489 from DMA 488 and sends a reservation request 494 to egress splicer 490. Egress arbiter 486 determines the correct port reservation request 494 on by polling the egress core to port dq_en 481 information that was sent by the egress receiver 472 that accompanies each non-bypassed data unit 478. Egress splicer 490 sends a ready signal 493 when a channel is available for the current data unit. Egress arbiter 486 sends a GT signal 487 to DMA 488 upon receipt of the ready signal 493 from egress splicer 490. To initiate the data unit transfer, in one embodiment, DMA 488 sends a push signal 492 to egress splicer 490 in an attempt to push the data unit onto an available communication channel. Egress splicer 490 forwards the data unit to egress transmitter 496 for communication over one of the virtual channels 499 that comprise physical channel 498. While the port enable PT_EN signal 497 is asserted by the egress transmitter 460 for virtual channel 467, the ingress splicer 440 marks the port corresponding to the virtual channel as ready. Egress transmitter 496 transmits the data unit to a communication line.

Bypassed data units 480 from bypassed channels are buffered in egress bypass store 482 as they await delivery to egress splicer 490. In one embodiment, egress bypass store 482 may be implemented using a store and forward technique. In another embodiment, a passthrough technique may be used. The store and forward and the passthrough techniques may be implemented as described above regarding FIG. 2.

Egress bypass store 482 sends bypass requests 484 to egress arbiter 486, signaling that a bypassed data unit or portion of a bypassed data unit is present and requires transmission. Egress arbiter 486 also receives similar requests from DMA unit 488, which services data units that have completed modification by processor core 444. Egress arbiter 486 monitors the readiness of egress splicer 490 to pull bypassed data units from egress bypass store 482. Egress arbiter 486 places a port reservation 494 with egress splicer 490.

When a port is ready, egress splicer 490 sends ready signal 493 to egress arbiter 486. Egress splicer 490 sends pull signal 495 to egress bypass store 482 which sends the bypassed data unit to egress splicer 490. Egress splicer 490 forwards the bypassed data unit to egress transmitter 496. In one embodiment, egress splicer 490 employs a fair use algorithm on available channels. In one embodiment, egress splicer 490 sends 128-byte portions of data units in a round robin fashion to egress transmitter 496 for each virtual channel 499 of physical channel 498. If egress bypass store 482 has fewer than 128-bytes, egress splicer 490 transfers whatever amount of data is available. Egress splicer 490 hunts for the end of the data unit to determine that the port reservation has been satisfied. Egress splicer 490 marks the port as ready after the data unit has been sent. In addition, egress splicer 490 may perform limited processing on bypassed data units. The kinds of limited splicer processing are discussed in more detail below with respect to FIG. 7.

Figure 5:
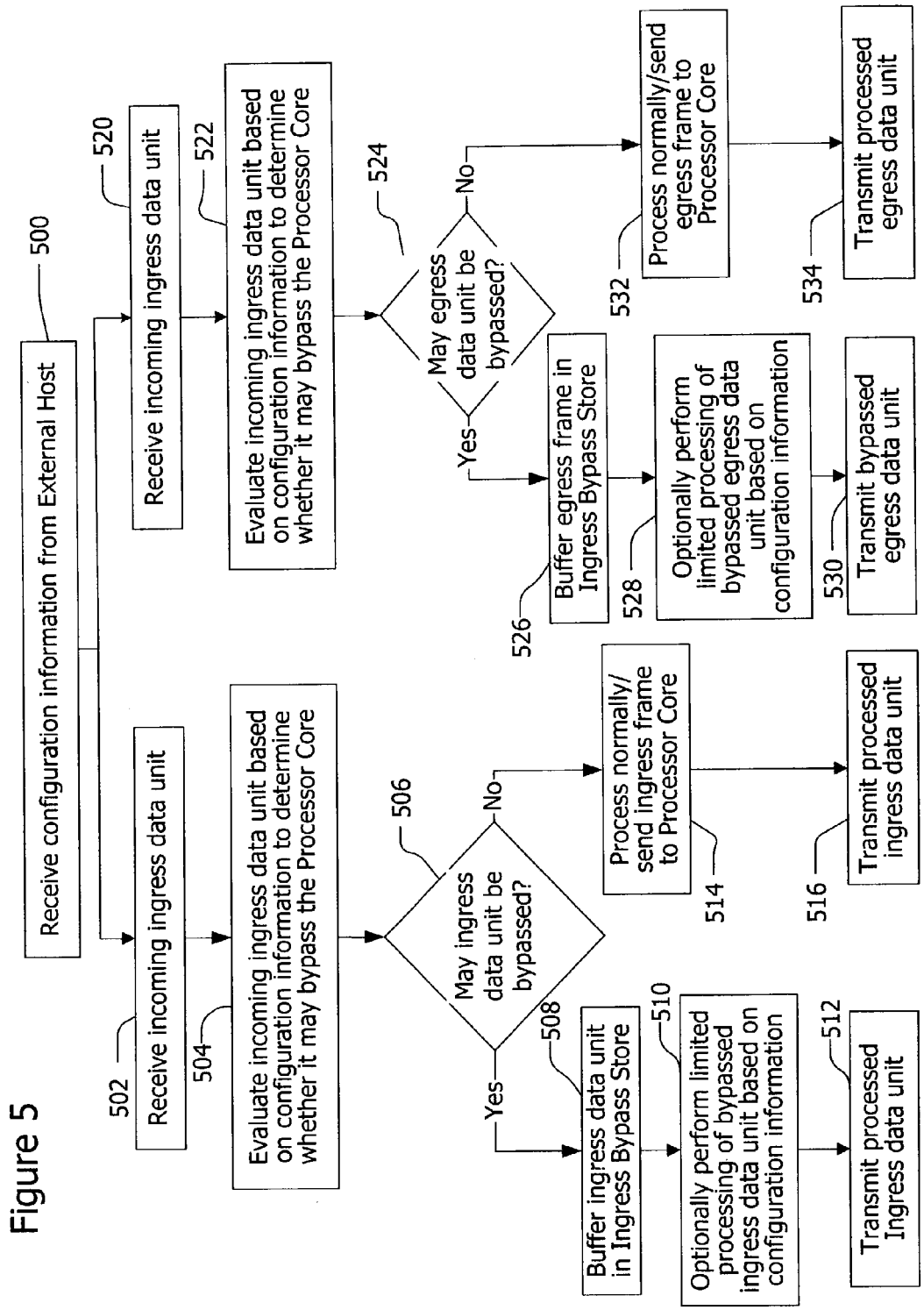
FIG. 5 illustrates a flow of actions taken according to an embodiment of a network processor having a full-duplex bypass circuit.

FIG. 5 illustrates a flow of actions taken according to an embodiment of a network processor having a full-duplex bypass circuit. The network processor receives configuration information from an external host, as shown in block 500. The configuration information may specify which channels or ports include data units which do not require processing and may bypass the processor core. This configuration information may specify a numerical or other identifier of those channels or ports having data units which may be bypassed. In another embodiment, the configuration may specify a type of file which may be bypassed. In this embodiment, well known file type identifiers may be used to designate those data units which should be bypassed from regular processing by the processor core. The network processor receives incoming ingress and egress data units, as shown in blocks 502 and 520. The flow of actions continues based on whether the incoming packet is an egress packet or an ingress packet, although the flow of actions is, in one embodiment, nearly identical.

With regard to ingress data units, the network processor evaluates whether the incoming ingress packet may bypass the processor core by referring to configuration information, as shown in block 504. To evaluate whether the ingress data unit should be bypassed, the channel or port identifier of the data unit and/or other information in the data unit such is compared with the configuration information. If the ingress data unit may be bypassed, as shown in block 506, the data unit is buffered in the ingress bypass store, as shown in block 508. In one embodiment, limited processing may be performed on the bypassed ingress data unit based on the configuration information, as shown in block 510. The kinds of limited processing are discussed in more detail below with respect to FIG. 7. The bypassed ingress data unit is transmitted, as shown in block 512.

If the ingress data unit may not be bypassed, as shown in block 506, the ingress data unit is processed normally such that the ingress data unit is sent to the processor core within the network processor, as shown in block 514. After the ingress data unit is processed, it is transmitted, as shown in block 516.

With regard to egress data units, the network processor evaluates whether the incoming egress packet may bypass the processor core by referring to configuration information, as shown in block 522. To evaluate whether the egress data unit should be bypassed, the channel or port identifier of the data unit is compared with the configuration information. If the egress data unit may be bypassed, as shown in block 524, the egress data unit is buffered in the egress bypass store, as shown in block 526. In one embodiment, limited processing may be performed on the bypassed egress data unit based on the configuration information, as shown in block 528. Unlike above with regard to ingress streams, many kinds of streams of egress data units having a particular virtual channel or port may be bypassed. Header stripping and other limited processing may be conducted on the bypassed egress data units. The kinds of limited processing are discussed in more detail below with respect to FIG. 7. The bypassed egress data unit is transmitted, as shown in block 530.

If the egress data unit may not be bypassed, as shown in block 524, the egress data unit is processed normally such that the egress data unit is sent to the processor core within the network processor, as shown in block 532. After the egress data unit is processed, it is transmitted, as shown in block 534.

Figure 6A:
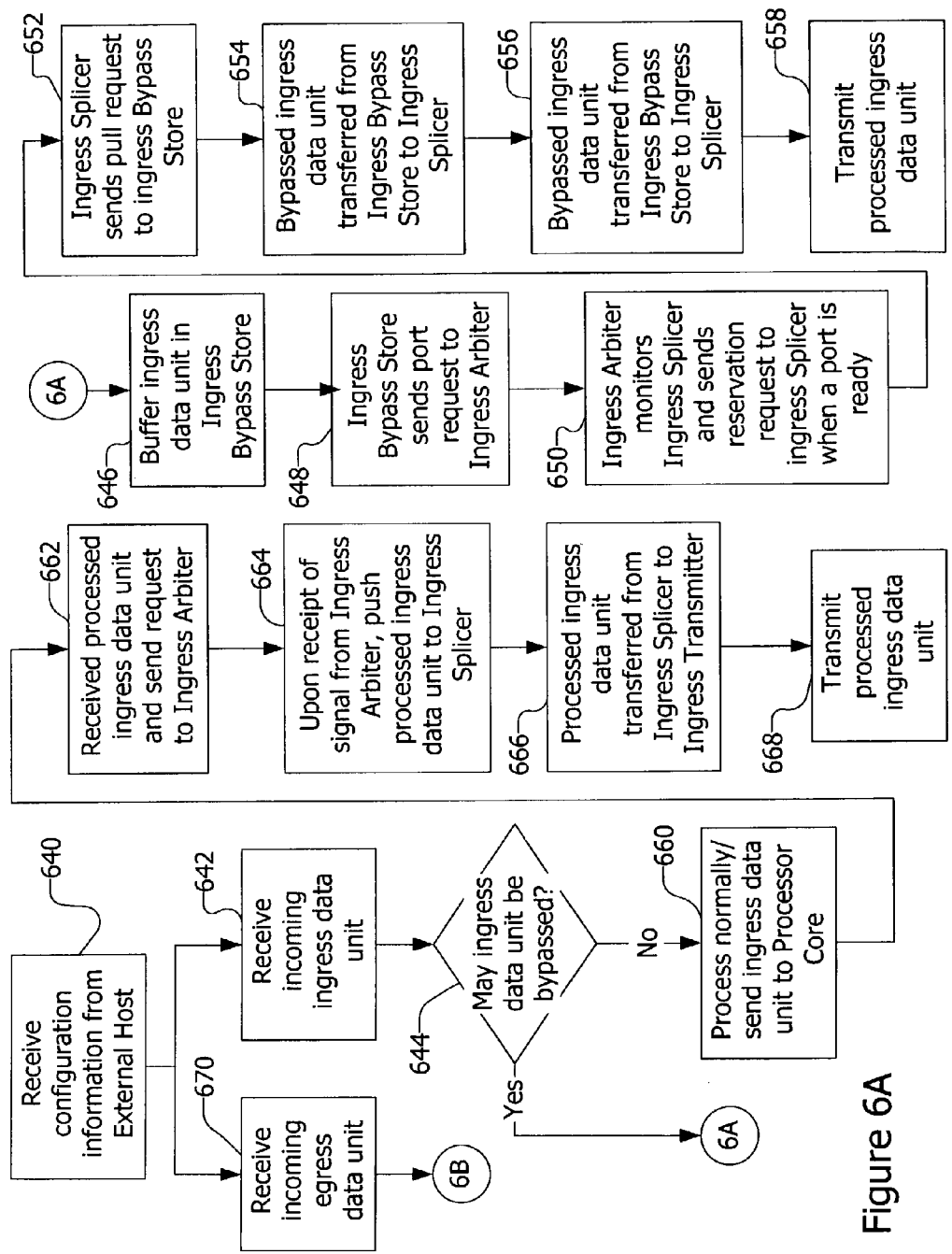
FIGS. 6A and 6B illustrates a more detailed flow of actions taken according to an embodiment of a network processor having a full-duplex bypass circuit.
Figure 6B:
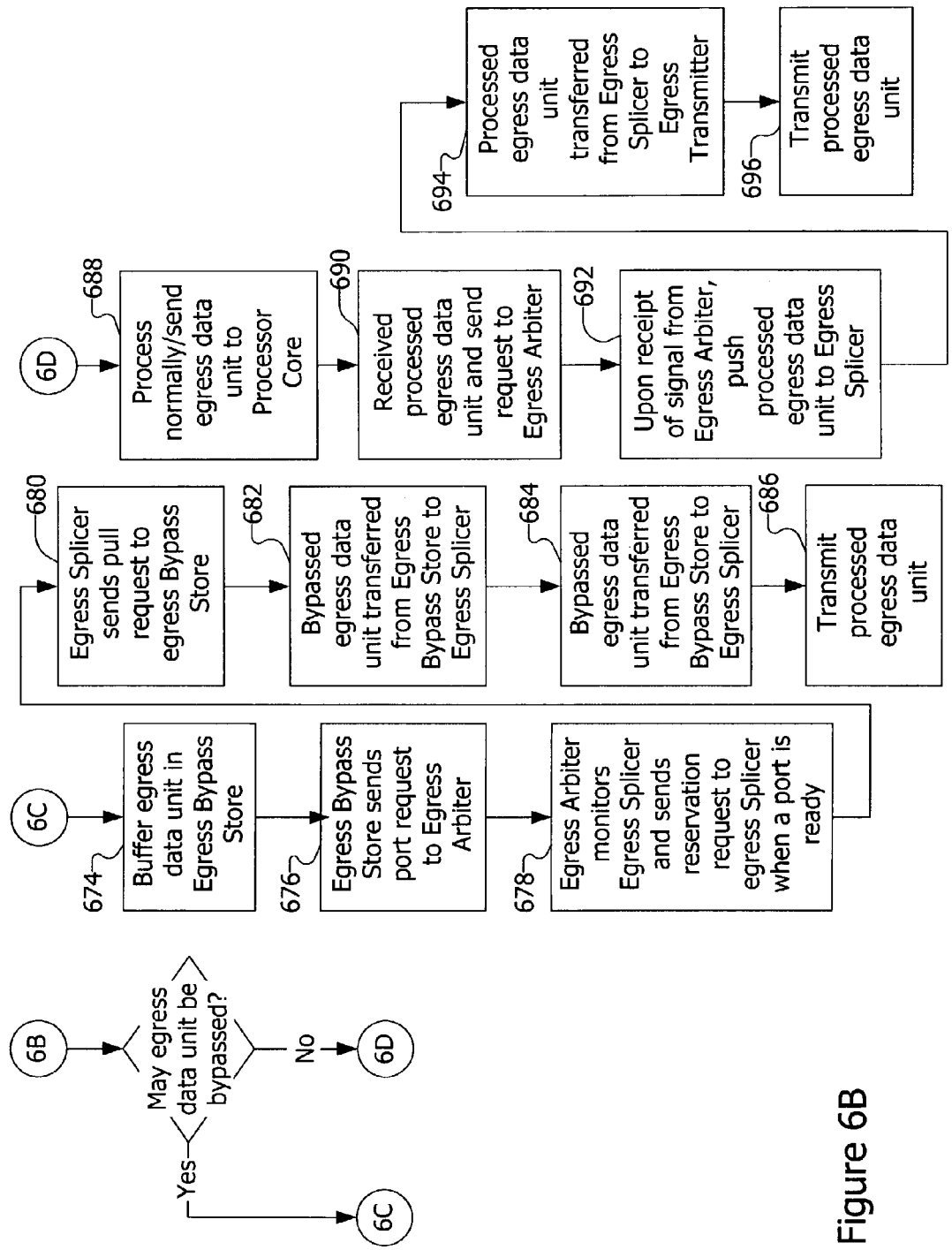

FIGS. 6A and 6B illustrate a more detailed flow of actions taken according to an embodiment of a network processor having a full-duplex bypass circuit. The network processor receives configuration information from an external host, as shown in block 640. The configuration information may specify which channels or ports include data units which do not require processing and may bypass the processor core. This configuration information may specify a numerical or other identifier of those channels or ports having data units which may be bypassed. The network processor receives incoming ingress data units, as shown in block 642, and determines whether the ingress data unit may be bypassed, as shown in block 644. Similarly, the network processor receives incoming egress data units, as shown in block 670, and determines whether the egress data unit may be bypassed, as shown in block 672. To evaluate whether the data unit should be bypassed, the channel or port identifier of the data unit is compared with the configuration information.

If the ingress data unit may be bypassed, the data unit is buffered in the ingress bypass store, as shown in block 646. The ingress bypass store sends a request to the ingress arbiter for an available port over which to send the buffered ingress bypassed data unit, as shown in block 648. The ingress arbiter monitors the ingress splicer and sends a reservation request to the ingress splicer when a port is ready, as shown in block 650. The ingress splicer sends a pull request to the ingress bypass store when a port is available, as shown in block 652. In response to the pull request, the ingress bypass store transfers the bypassed ingress data unit to the ingress splicer, as shown in block 654.

In addition, the ingress splicer may perform limited processing on bypassed data units. The limited processing may be controlled by configuration information provided by an external host. The kinds of limited splicer processing are discussed in more detail below with respect to FIG. 7.

The ingress splicer transfers the bypassed data unit to the ingress transmitter, as shown in block 656, and the bypassed ingress data unit is transmitted, as shown in block 658. In one embodiment, the transmission of the bypassed ingress data unit is to a switch card.

If the ingress data unit may not be bypassed, as shown in block 644, the ingress data unit is processed normally such that the ingress data unit is sent to the processor core within the network processor, as shown in block 660. After the ingress data unit is processed, a port request is sent to the ingress arbiter, as shown in block 662. In one embodiment, this may be achieved via a DMA unit. Upon receipt of a signal from the ingress arbiter, the processed ingress data unit is pushed to the ingress splicer, as shown in block 664. Again, in one embodiment, this may be achieved via a DMA unit. The ingress splicer transfers the processed ingress data unit to the ingress transmitter, as shown in block 666. The processed ingress data unit is transmitted on a network, as shown in block 668.

With regard to the processing of egress data units, if the egress data unit may be bypassed, that is, the port or channel identifier matches an identifier in the configuration information, the flow of actions continues with block 674. In another embodiment, in place of or in addition to the port/channel identifier being checked, the type of data unit may be examined to learn whether the data unit type is specified in the configuration information as a type of data unit that should be bypassed.

If the egress data unit may be bypassed, the data unit is buffered in the egress bypass store, as shown in block 674. The egress bypass store sends a request to the egress arbiter for an available port over which to send the buffered egress bypassed data unit, as shown in block 676. The egress arbiter monitors the egress splicer and sends a reservation request to the egress splicer when a port is ready, as shown in block 678. The egress splicer sends a pull request to the egress bypass store when a port is available, as shown in block 680. In response to the pull request, the egress bypass store transfers the bypassed egress data unit to the egress splicer, as shown in block 682. In addition, in one embodiment, the egress splicer may perform limited processing on bypassed data units. The limited processing may be controlled by configuration information provided by an external host. The kinds of limited splicer processing are discussed in more detail below with respect to FIG. 7. The egress splicer transfers the bypassed egress data unit to the egress transmitter, as shown in block 684, and the bypassed egress data unit is transmitted on a network, as shown in block 686.

If the egress data unit may not be bypassed, as shown in block 672, the egress data unit is processed normally such that the egress data unit is sent to the processor core within the network processor, as shown in block 688. After the egress data unit is processed, a port request is sent to the egress arbiter, as shown in block 690. In one embodiment, this may be achieved via a DMA unit. Upon receipt of a signal from the egress arbiter, the processed egress data unit is pushed to the egress splicer, as shown in block 692. Again, in one embodiment, this may be achieved via a DMA unit. The egress splicer transfers the processed egress data unit to the egress transmitter, as shown in block 694. The processed egress data unit is transmitted on a network, as shown in block 696.

Figure 7:
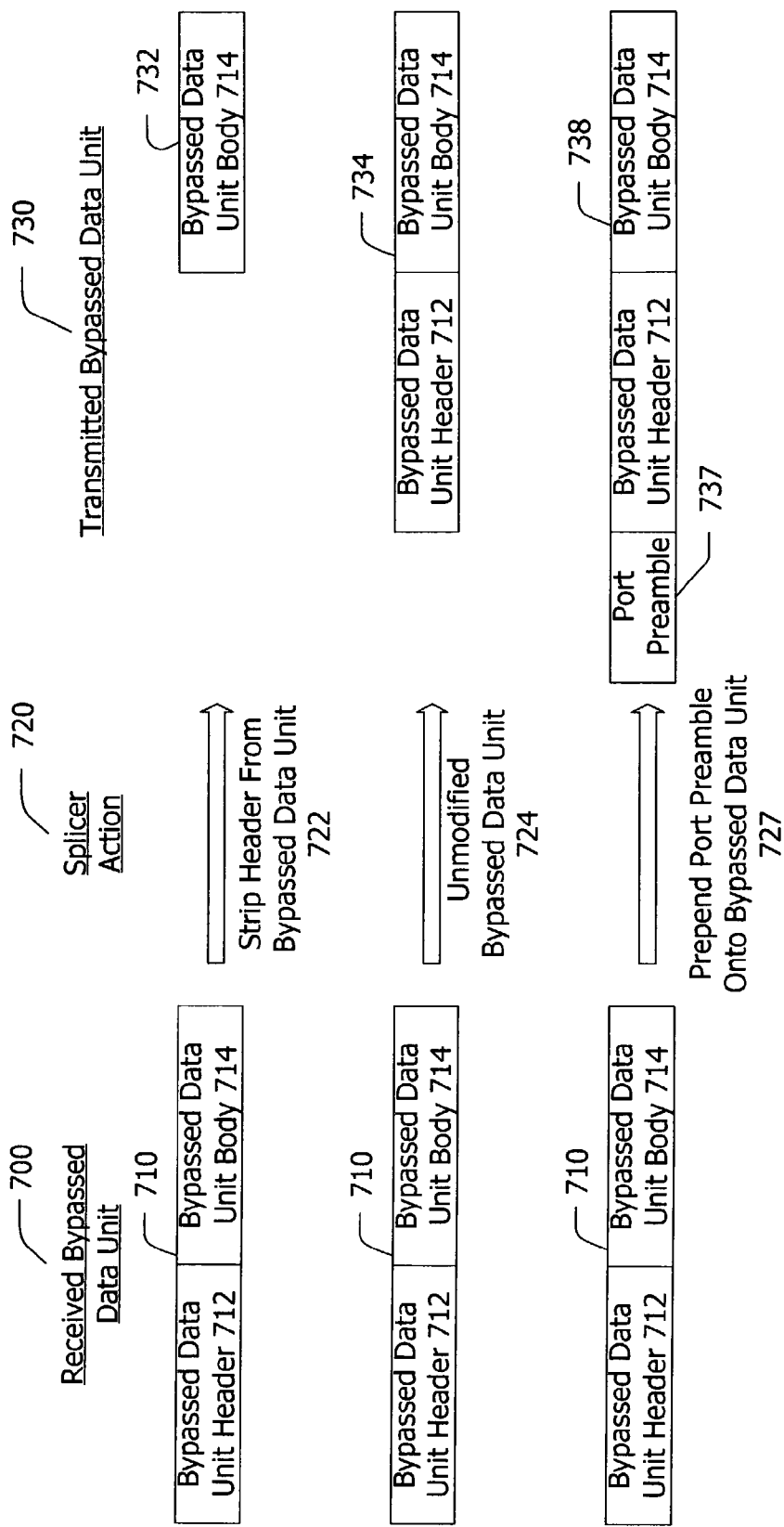
FIG. 7 illustrates actions taken by a splicer according to an embodiment of the network processor described herein.

FIG. 7 illustrates actions taken by an embodiment of a splicer included in an embodiment of a network processor, such as splicers 270, 440 and 492 discussed above regarding FIGS. 2 and 4. In one embodiment, the splicer may perform a limited set of operations on the incoming bypassed data unit. The splicer refers to configuration information provided by an external host to determine which actions should be taken on which data units. In another embodiment, the splicer may also perform limited post-processing on non-bypassed data units.

Generally, the splicer takes a received bypassed data unit 700, performs an action 720 on the bypassed data unit and transmits the bypassed data unit 730. In one embodiment, bypassed data unit 710 may be have a bypassed data unit header 712 and a bypassed data unit body 714. In one embodiment, the splicer may be configured by an external host to locate a designated cut point within a bypassed data unit such that the splicer strips away the header of all data units associated with a particular channel at the cut point before the data unit is sent to the transmitter, as shown by element 722. In this embodiment, the transmitted bypassed data unit 732 includes only the bypassed data unit body 714. The bypassed data unit may also be sent to the transmitter unmodified in its entirety, as shown by element 724. In this embodiment, the received bypassed data unit 710 and the transmitted bypassed data unit 734 are the same. In one embodiment, the splicer may contain a per-port memory that a host can configure with a preamble that the splicer prepends onto every data unit within an associated port, as shown by element 726. The result is a transmitted bypassed data unit having port preamble 736, bypassed data unit header 712 and bypassed data unit body 714. In yet another embodiment, the splicer may be configured to substitute or replace header data within the received bypassed data unit so that the transmitted bypassed data unit may include a header with one or more fields that differ from the received bypassed data unit.

The backend of the splicer does not discriminate between bypassed and non-bypassed data units. In one embodiment, a bypassed channel may be rerouted to the extraction unit (framer) instead of being presented to the transmitter. This It is claimed:

1. A network processor comprising
a receiver to receive data units
configuration information received from an external host, wherein the configuration information is stored in a dedicated configuration storage, wherein the configuration information is used to evaluate whether the data units require processing, and wherein the configuration information comprises a port identifier of a virtual channel to identify the data units that require processing
a processor core to process data units that require processing
a bypass store to hold those data units which do not require processing by the processor core and which await delivery to a splicer
an arbiter to evaluate whether a port is available to receive the data units from the bypass store or the processor, the arbiter further configured to
receive a request for an available port from the processor core
generate and send a signal to the processor core when a port is available the splicer to
receive a port reservation request from the arbiter
send a pull signal to the bypass store to cause the bypass store to transfer a bypassed data unit to the splicer
transfer the bypassed data unit to a transmitter, wherein the transmitter is configured to transmit the data units.

2. The network processor of claim 1 wherein the splicer is configured to
perform limited processing on those data units which do not require processing by the processor core.

3. The network processor of claim 1 wherein the network processor is one selected from the group comprising an application specific integrated circuit and a programmable logic array.

4. The network processor of claim 1 wherein the processor core is a single processor.

5. An integrated circuit chip comprising the network processor of claim 1.

6. A line card comprising the integrated circuit chip of claim 5.

7. A switch comprising the line card of claim 6.

8. A network processor comprising:
an ingress receiver to receive ingress data units and ingress configuration information, wherein the ingress configuration information is received from an external host
an egress receiver to receive egress data units and egress configuration information
ingress configuration storage to store ingress configuration information which is to be used to evaluate whether the ingress data units require processing, wherein the ingress configuration information comprises a port identifier of a virtual channel to identify the data units that require processing
egress configuration storage to store egress configuration information which is to be used to evaluate whether the egress data units require processing, wherein the egress configuration information comprises the port identifier of the virtual channel to identify the data units that require processing
a processor core to process ingress data units and egress data units that require processing
an ingress bypass store to hold those ingress data units which do not require processing by the processor core and which await delivery to an ingress splicer
an egress bypass store to hold those egress data units which do not require processing by the processor core and which await delivery to an egress splicer
an ingress arbiter to evaluate whether a port is available to receive an ingress frame from the ingress bypass store or the processor core, wherein the ingress arbiter is
configured to receive a request for an available port from the processor core and
generate and send a signal to the processor core when a port is available
an egress arbiter to evaluate whether a port is available to receive an egress frame from the egress bypass store or the processor core, wherein the egress arbiter is
configured to receive a request for an available port from the processor core and
generate and send a signal to the processor core when a port is available
an ingress transmitter to transmit the data units
an egress transmitter to transmit the data units.

9. The network processor of claim 8 wherein
the ingress splicer is configured to
receive an ingress transmitter port reservation request from the ingress arbiter
send an ingress pull signal to the ingress bypass store to cause the ingress bypass store to transfer a bypassed ingress frame to the ingress splicer
transfer the bypassed ingress frame to the ingress transmitter
the egress splicer is configured to
receive an egress transmitter port reservation request from the egress arbiter
send an egress pull signal to the egress bypass store to cause the egress bypass store to transfer a bypassed egress frame to the egress splicer
transfer the bypassed egress frame to the egress transmitter.

10. The network processor of claim 8 wherein
the ingress splicer is configured to perform limited processing on those ingress data units which do not require processing by the processor core
the egress splicer is configured to perform limited processing on those egress data units which do not require processing by the processor core.

11. The network processor of claim 8 wherein the network processor is one selected from the group comprising an application specific integrated circuit and a programmable logic array.

12. The network processor of claim 8 wherein the processor core is a single processor.

13. An integrated circuit chip comprising the network processor of claim 8.

14. A line card comprising the integrated circuit chip of claim 13.

15. A network device comprising the line card of claim 14.

16. The network device of claim 15, wherein the network device is one of a switch, a router, a hub, and a multiplexor.

17. A method implemented on a network processor, the method comprising:
receiving a plurality of data units receiving configuration information from an external host, wherein the configuration information is stored in a dedicated configuration storage, and wherein the configuration information comprises a port identifier of a virtual channel to identify the data units that require processing evaluating whether each of the data units requires processing based on the configuration information bypassing processing those of the data units that do not require processing based on the evaluating and storing in a bypass store those data units that do not require processing as they await delivery to a splicer, including sending a request to an arbiter requesting an available port over which to send the data units and further including receiving a signal generated by the arbiter when a port is available processing those of the data units that require processing based on the evaluating, including sending a request to an arbiter requesting an available port over which to send the data units and further including receiving a signal generated by the arbiter when a port is available transmitting the data units via one of a plurality of virtual channels of a physical channel.

18. The method of claim 17 wherein the processing the frame is performed by a processor core of the network processor.

19. The method of claim 17 wherein the bypassing includes performing limited processing by the splicer on some of the plurality of data units.

20. The method of claim 19 wherein the limited processing is based on the configuration information.

21. A method implemented on a network processor, the method comprising:

receiving a plurality of ingress data units and egress data units receiving configuration information from an external host, wherein the configuration information is stored in a dedicated configuration storage, and wherein the configuration information comprises a port identifier of a virtual channel to identify the data units that require processing evaluating whether each of the ingress data units and egress data units requires processing based on the configuration information bypassing processing those of the ingress data units and egress data units that do not require processing based on the evaluating and storing in a bypass store those data units that do not require processing as they await delivery to an ingress splicer or an egress splicer, including sending a request to an arbiter requesting an available port over which to send the data units and further including receiving a signal generated by the arbiter when a port is available processing those of the ingress data units and egress data units that require processing based on the evaluating, including sending a request to an arbiter requesting an available port over which to send the data units and further including receiving a signal generated by the arbiter when a port is available transmitting the egress data units and the ingress data units.

22. The method of claim 21 wherein the processing is performed by a processor core of the network processor.

23. The method of claim 21 wherein the bypassing includes performing limited processing by the ingress splicer on some of the ingress data units.

performing limited processing by the egress splicer on some of the egress data units.

24. The method of claim 23 wherein the limited processing is based on the configuration information.

\* \* \* \* \*